(12) United States Patent
Holman

(10) Patent No.: US 8,752,670 B2
(45) Date of Patent: Jun. 17, 2014

(54) ADJUSTABLE BRACKET FOR A TREE STAND

(76) Inventor: Derrick R. Holman, Winterset, IA (US)

(*) Notice: Subject to any disclaimer, the term of this patent is extended or adjusted under 35 U.S.C. 154(b) by 205 days.

(21) Appl. No.: 13/354,962

(22) Filed: Jan. 20, 2012

(65) Prior Publication Data

US 2012/0186913 A1 Jul. 26, 2012

Related U.S. Application Data

(60) Provisional application No. 61/434,914, filed on Jan. 21, 2011.

(51) Int. Cl.
*A01M 31/02* (2006.01)
*E04G 3/28* (2006.01)

(52) U.S. Cl.
USPC ........................................................ 182/187

(58) Field of Classification Search
USPC ......... 182/187, 188; 248/316.4, 316.6, 228.3, 248/228.5, 231.41, 231.61, 354.3, 354.4
See application file for complete search history.

(56) References Cited

U.S. PATENT DOCUMENTS

| | | | | | |
|---|---|---|---|---|---|
| 1,564,703 | A | * | 12/1925 | Nichols | 248/539 |
| 3,347,543 | A | * | 10/1967 | Zak | 269/296 |
| 3,493,080 | A | * | 2/1970 | Ehlert et al. | 182/187 |
| 5,458,215 | A | * | 10/1995 | Burgin | 182/187 |
| 5,954,158 | A | * | 9/1999 | Concepcion | 182/187 |
| 6,439,344 | B1 | * | 8/2002 | Cole | 182/113 |
| 7,434,662 | B2 | * | 10/2008 | McFall et al. | 182/187 |
| 8,181,743 | B2 | * | 5/2012 | duCellier | 182/187 |
| 2009/0095569 | A1 | * | 4/2009 | Cooper et al. | 182/187 |
| 2011/0192680 | A1 | * | 8/2011 | Tong | 182/187 |

* cited by examiner

*Primary Examiner* — Alvin Chin Shue
(74) *Attorney, Agent, or Firm* — Zarley Law Firm, P.L.C.

(57) ABSTRACT

An adjustable bracket for a tree stand having a mounting plate and a first bracket member and a second bracket member. The mounting plate has a mounting plate locking ring. A threaded shaft which terminates in a brace is extended through the mounting plate locking ring. The mounting plate is connected to the tree stand by the first bracket member and the second bracket member. When the tree stand is positioned in a tree the threaded shaft is rotated through the mounting plate locking ring until the brace engages the tree. In this way the tree stand is stabilizing and adjusted.

8 Claims, 3 Drawing Sheets

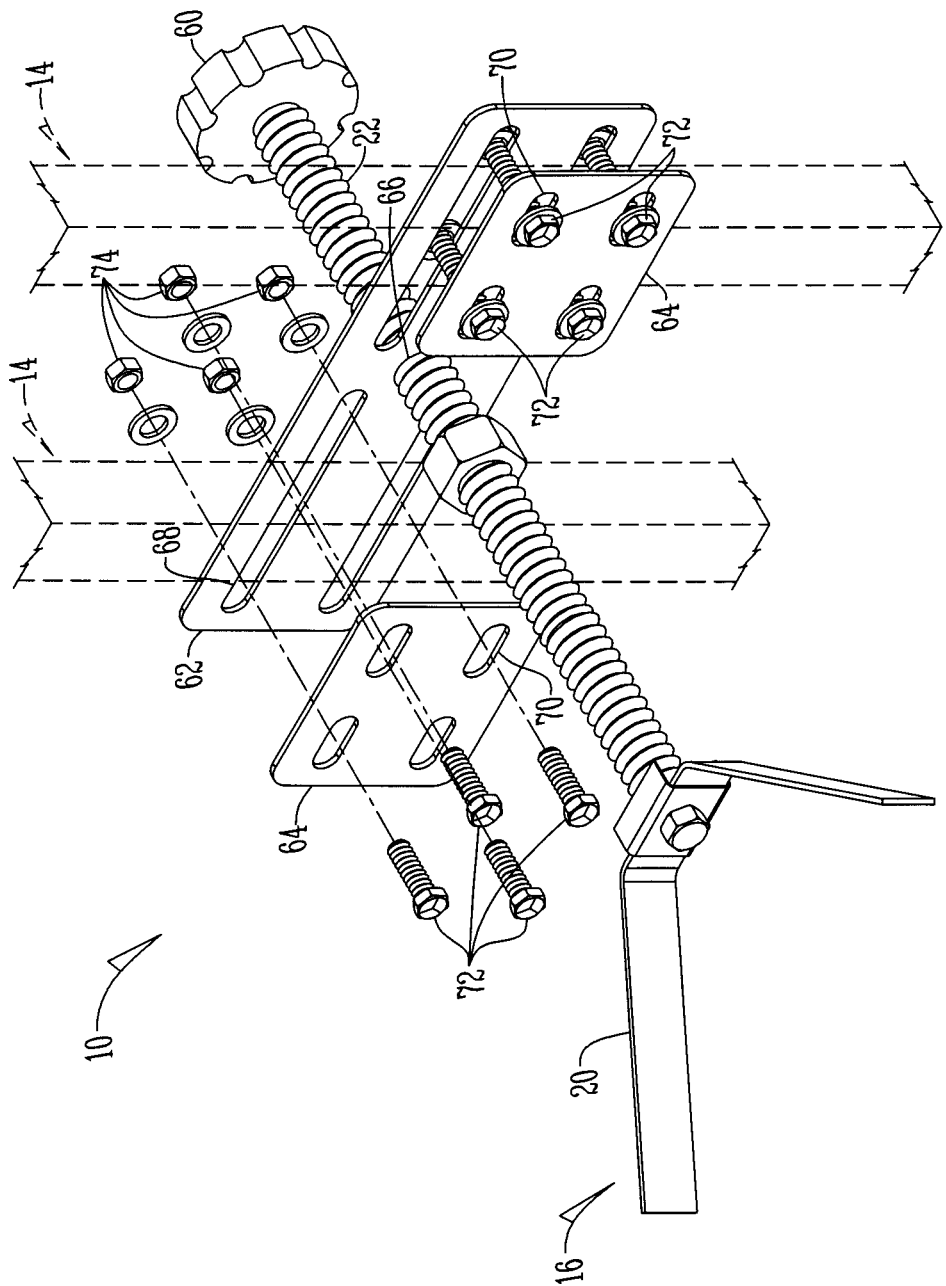

ADJUSTABLE BRACKET FOR A TREE STAND

CROSS REFERENCE TO RELATED APPLICATION

This application claims the benefit of U.S. Provisional Application No. 61/434,914 filed January 21.

BACKGROUND OF THE INVENTION

This invention is directed toward an adjustable bracket for a tree stand.

Tree stands are known in the art. Typically, tree stands have a fixed brace member attached to a stand that is positioned to engage a tree to provide leverage to hold the stand in place when attached to a tree. Because the brace member is fixed, sometimes, because of the angle of the tree, a user is unable to secure the tree stand in a level position. Accordingly, there exists a need in the art for an adjustable bracket that can address this deficiency.

Therefore, an objective of the present invention is to provide a bracket for a tree stand where the brace member is adjustable.

Another objective of the invention is to provide a bracket that can be attached to any tree stand.

Yet another objective of the invention is to provide a bracket that can adjust to abnormalities in trees such as a tree that extends at an angle.

These and other objectives will be apparent to one of skill in the art based upon the following disclosure.

BRIEF SUMMARY OF THE INVENTION

An adjustable bracket for a tree stand having a mounting plate and a first bracket member and a second bracket member. The mounting plate has a mounting plate locking ring. A threaded shaft which terminates in a brace is extended through the mounting plate locking ring. The mounting plate is connected to the tree stand by the first bracket member and the second bracket member. When the tree stand is positioned in a tree the threaded shaft is rotated through the mounting plate locking ring until the brace engages the tree. In this way the tree stand is stabilizing and adjusted.

BRIEF DESCRIPTION OF THE DRAWINGS

FIG. 3 is a perspective view of an adjustable bracket for a tree stand.

DETAILED DESCRIPTION OF THE PREFERRED EMBODIMENT

Figure 1:
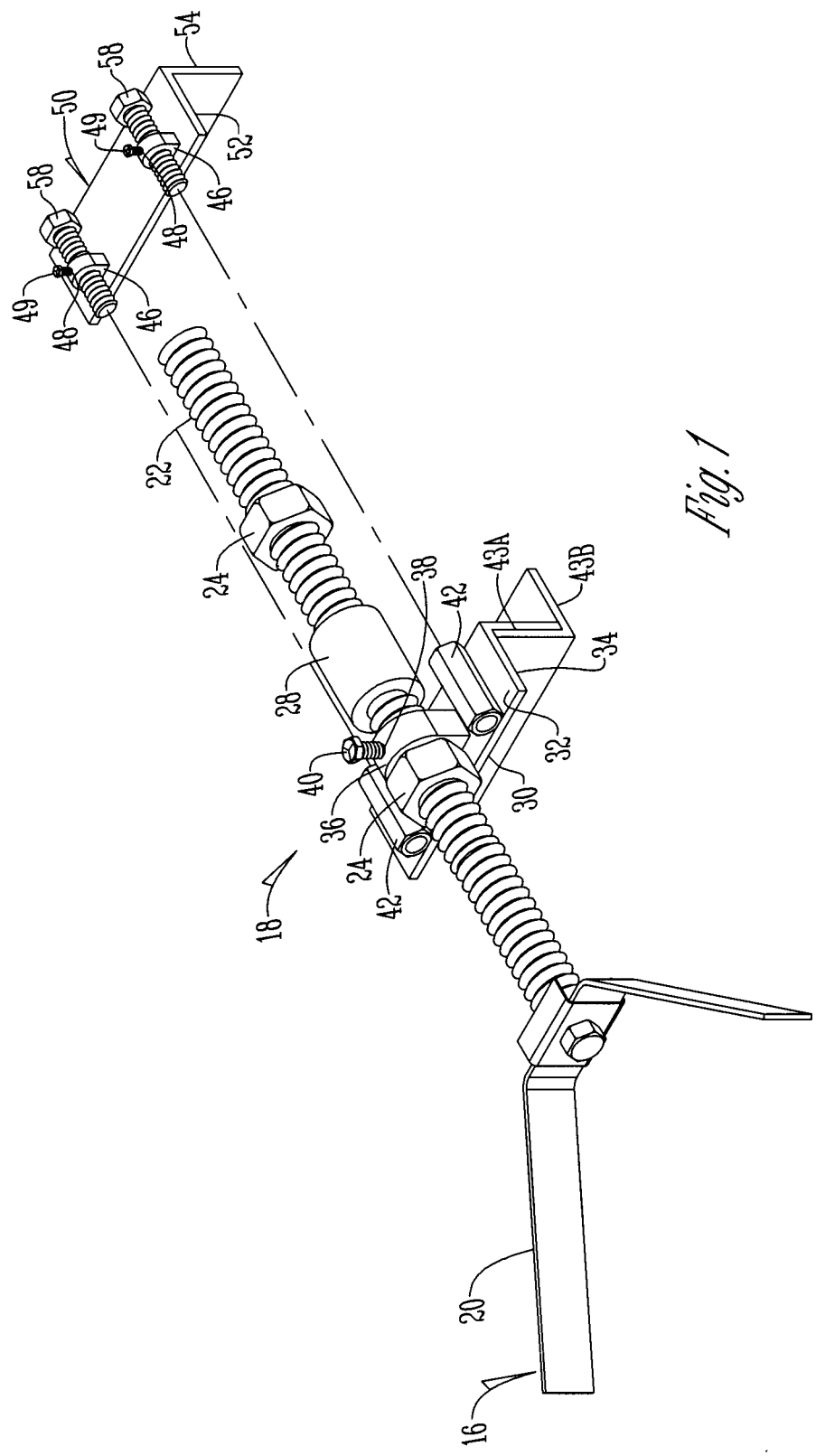
FIG. 1 is a perspective view of an adjustable bracket for a tree stand.
Figure 2:
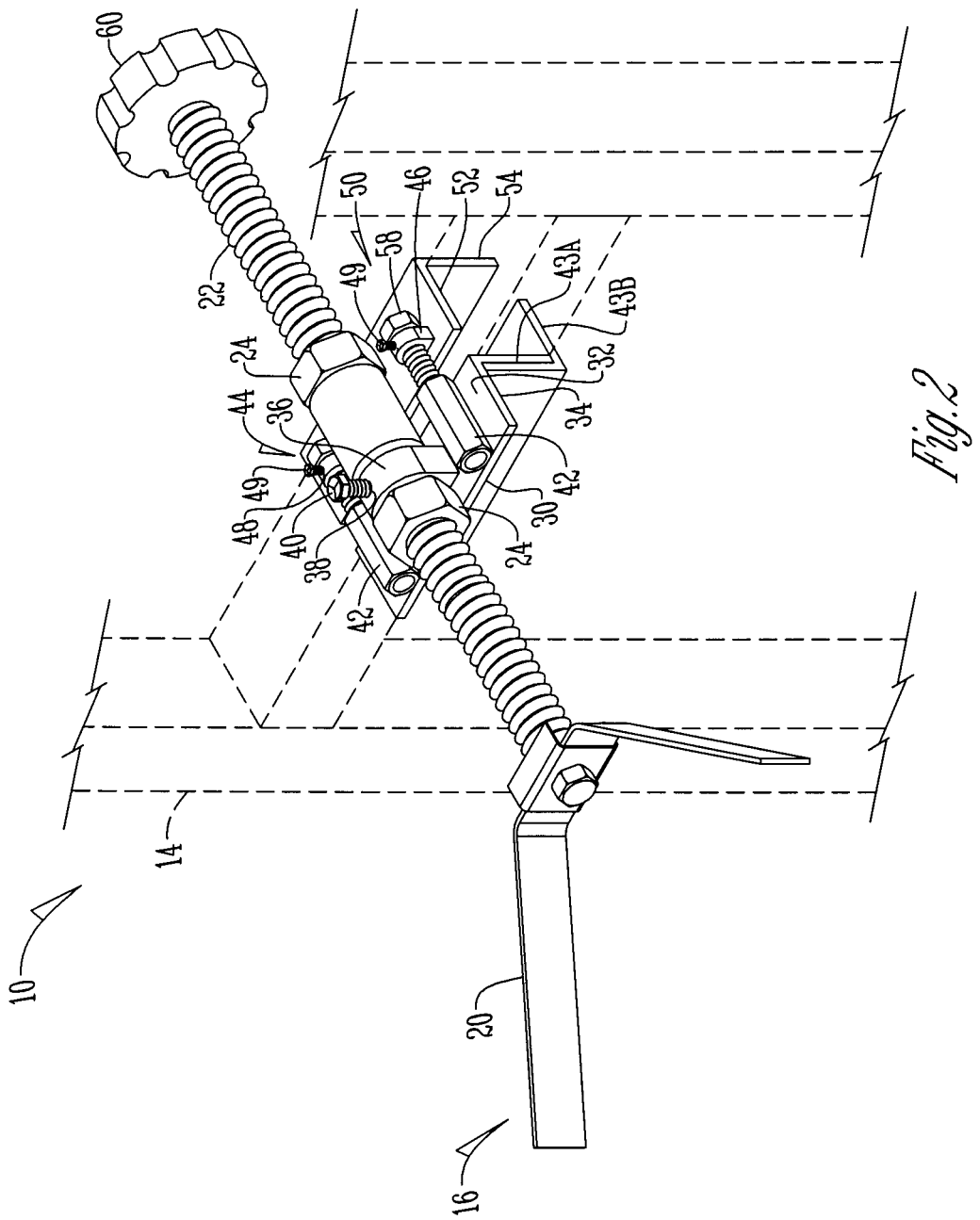
FIG. 2 is a perspective view of an adjustable bracket for a tree stand.

Referring to the Figures a tree stand 10 has a support member 12 attached to a frame 14. An adjustable brace member 16 is attached to the frame 14 member by a bracket 18. In a preferred embodiment the brace member 16 has a brace 20 attached to a threadable shaft 22. Threadably attached to the shaft 22 are a pair of locking nuts 24, on each side of a sleeve 28 that receives the shaft 22.

The bracket 18 is of any size, shape, and structure to receive the brace member 16 and attach to the frame 14 of the stand 10. In one example the bracket 18 has a mounting plate 30 having a top surface 32 and a bottom surface 34. Attached to the top surface 32 of the mounting plate 30 is a locking ring 36 with an opening 38 on its top surface to receive a set screw 40. The locking ring 36 receives the shaft 22 of the brace member 16 and is positioned between a locking nut 24 and the sleeve 28.

Also attached to the mounting plate 30 on each side of the locking ring 36 are a pair of bracket sleeves 42 that are generally in parallel spaced alignment with one another. Preferably, bracket sleeves 42 are connected to the top surface 32 of the mounting plate 30. Mounting plate 30 preferably has a Z-shaped profile. That is, mounting plate 30 preferably extends horizontally between its ends between its top surface 32 and its bottom surface 34. Downwardly extending vertical portion 43A is connected to the end of mounting plate 30 opposite brace member 16. The downwardly extending vertical portion 43A terminates in a generally horizontal portion 43B which extends away from brace member 16.

A first bracket member 44 is attached to the mounting plate 30 through the bracket sleeves 42. The first bracket member 44 has a pair of first bracket locking rings 46 with an opening 48 at their top surface for receiving a set screw 49. The first bracket locking rings 46 are attached to a first attachment member 50 that preferably is L-shaped having a horizontal portion 52 attached to the bracket locking ring 46 that terminates into a downwardly extending vertical portion 54. Preferably the downwardly extending vertical portion 54 is connected to the side of the horizontal portion 52 away from bracket sleeve 42 and/or brace member 16. A pair of bolts 58 threadably extend through the bracket locking rings 46 and into the bracket sleeves 42 to adjust the distance between the bracket locking rings 46 and the bracket sleeves 42.

In operation the shaft 22 of the brace member 16 is threadably inserted through a locking nut 24, then the locking ring 36, then the sleeve 28, and finally the second locking nut 24. Next, the first bracket member 44 is attached to the mounting plate 30 by threadably inserting a bolts 58 through the bracket rings 46 and into the bracket sleeves 42.

At this point, the first bracket member 44 is positioned such that the first attachment member 50 receives the horizontally extending support member 12 of frame 14 of the tree stand 10 such that the horizontal portion 52 and vertical portion 54 engaged the support member 12. The Z-shaped mounting plate 30 then tightened by threadably inserting a bolts 58 through the bracket rings 46 and into the bracket sleeves 42 such that the vertical portion 43A and the horizontal portion 43B of the mounting plate 30 engages the horizontally extending support member 12 of frame 14 of the tree stand 10. Once the bolts 58 have been adjusted to the desired position and the horizontally extending support member 12 of frame 14 of the tree stand 10 is fitted tightly between the mounting plate 30 and the first bracket member 44 the set screws 49 are tightened.

Finally, the brace member 16 is adjusted to engage the tree and maintain the tree stand 10 in a generally level position by rotating the shaft 22 within the locking nuts 24. To assist with rotating shaft 22 a large hand crank 60 is connected to the end of shaft 22, opposite the end having brace member 16. Hand crank 60 allows a user to rotate shaft 22 and adjust tree stand 10 quickly, easily and without the use of any tools. Once adjusted to the desired position the set screw 40 of the locking ring 36 is tightened, thereby holding the tree stand 10 in place.

In an alternative arrangement, a rectangular bracket 62 is used and a pair of square brackets 64 to attach threaded shaft 22 to tree stand 10. Rectangular bracket 62 has a threaded hole 66 positioned at its center which is sized and shaped to threadably receive the threaded shaft 22. Positioned in each corner of the rectangular bracket 62 is an elongated slot 68 which are spaced in parallel spaced alignment and extend parallel to the longer length of the rectangular bracket 62.

Similarly, square brackets 64 have an elongate slot 70 positioned in each corner of the square bracket 64 which are spaced in parallel spaced alignment and extend parallel to the length of a side of the square bracket 64. Each slot receives a matched bolt 72 and nut 74.

In operation, the length of rectangular bracket 62 is longer than the distance between the opposing vertically extending frame members 14 of tree stand 10. As such, to attach the adjustable brace member 16 to the tree stand 10 the user places the rectangular bracket 62 such that it extends across the opposing vertically extending frame members 14. Once in this position, the user places a square bracket 64 on the opposite side of the frame 14 from the rectangular bracket 62. Next the user passes a bolt 72 through the each of the slots 68, 70 of brackets 62, 64 and a nut 74 is tightened on the opposite side such that the frame 14 is squarely trapped between the bolts of bolts 72 and the faces of brackets 62, 64. In this way, brackets 62, 64 are attached to tree stand 10.

Once in this position, threaded shaft is passed through threaded hole 66 and adjustable brace member 16 is attached to the end of threaded shaft, which freely rotates on a bearing so as to allow the brace member 16 to stay in place on the tree while the shaft 22 is rotated by hand crank 60.

In an alternative arrangement, a rectangular bracket 62 is positioned on each side of the frame 14, eliminating the need for square brackets 64.

It will be appreciated by those skilled in the art that other various modifications could be made to the device without departing from the spirit and scope of the invention. All such modifications and changes fall within the scope of the claims and are intended to be covered thereby.

What is claimed:

1. A tree stand having an adjustable bracket, comprising:
a mounting plate having a mounting plate locking ring and at least one bracket sleeve having a first end and a second end;
a threaded shaft extending through the mounting plate locking ring and having a first and a second nut wherein the first nut is positioned between a crank and a sleeve to provide a first stop and the second nut is positioned between the mounting plate locking ring and a brace to provide a second stop;
a first bracket member having at least one first bracket member locking ring;
wherein the first bracket member is connected to the mounting plate and to the tree stand so as to allow for adjustment of the tree stand while in use.

2. The adjustable bracket of claim 1, wherein a set screw is connected to the mounting plate locking ring.

3. The adjustable bracket of claim 1, wherein a set screw is connected to the first bracket member locking ring.

4. The adjustable bracket of claim 1, wherein the first bracket member is connected to a first end of the bracket sleeve.

5. A tree stand having an adjustable bracket, comprising:
a mounting plate having a mounting plate locking ring and a pair of bracket sleeves, one bracket sleeve positioned on either side of the mounting plate locking ring;
a threaded shaft extending through the mounting plate locking ring and having a first and a second nut wherein the first nut is positioned between a crank and a sleeve to provide a first stop and the second nut is positioned between the mounting plate locking ring and a brace to provide a second stop;
a first bracket member having a pair of first bracket member locking rings;
wherein the first bracket member is attached to the mounting plate by threading a bolt through each of the first bracket member locking rings and into a corresponding bracket sleeve.

6. A tree stand having an adjustable bracket, comprising:
a sleeve that receives a threaded shaft that terminates in a brace;
a pair of nuts threadably received on the threaded shaft, wherein the pair of nuts is positioned on either side of the sleeve;
a mounting plate having a mounting plate locking ring attached to a top surface of the mounting plate wherein the mounting plate locking ring receives the threaded shaft and is positioned between a nut and the sleeve;
a pair of bracket sleeves positioned on the top surface on either side of the mounting plate locking ring; and
a first bracket member having a pair of first bracket locking rings on a top surface of the first bracket member;
wherein the first bracket member is attached to the mounting plate by a pair of bolts threadably extending through the first bracket locking rings and the corresponding pair of bracket sleeves.

7. The adjustable bracket of claim 6 wherein the end of the threaded shaft opposite the brace terminates in a crank.

8. The adjustable bracket of claim 6 wherein the mounting plate is a Z-shape and the first bracket member is an L-shape.

* * * * *